(12) United States Patent
Masuda

(10) Patent No.: US 9,482,938 B2
(45) Date of Patent: Nov. 1, 2016

(54) LASER BEAM PROJECTION APPARATUS AND PROJECTOR HAVING LIGHT SOURCE MODULE FOR COMBINATION

(71) Applicant: Makoto Masuda, Nara (JP)

(72) Inventor: Makoto Masuda, Nara (JP)

(*) Notice: Subject to any disclaimer, the term of this patent is extended or adjusted under 35 U.S.C. 154(b) by 0 days.

(21) Appl. No.: 14/516,070

(22) Filed: Oct. 16, 2014

(65) Prior Publication Data

US 2015/0109585 A1 Apr. 23, 2015

(30) Foreign Application Priority Data

Oct. 18, 2013 (JP) ................................. 2013-217041

(51) Int. Cl.
| | |
|---|---|
| G03B 21/10 | (2006.01) |
| G03B 33/12 | (2006.01) |
| G03B 21/20 | (2006.01) |
| H04N 9/31 | (2006.01) |
| G02B 27/10 | (2006.01) |

(52) U.S. Cl.
CPC ............. *G03B 33/12* (2013.01); *G02B 27/104* (2013.01); *G03B 21/2033* (2013.01); *G03B 21/2093* (2013.01); *H04N 9/3129* (2013.01); *H04N 9/3141* (2013.01); *G03B 21/10* (2013.01)

(58) Field of Classification Search
CPC ............. G02B 27/104; G03B 21/2033; G03B 21/2093; G03B 33/12; G03B 21/10; H04N 9/3129; H04N 9/3141
See application file for complete search history.

(56) References Cited

U.S. PATENT DOCUMENTS

| | | | | |
|---|---|---|---|---|
| 2006/0279663 A1* | 12/2006 | Wittenberg | ........... | G06F 1/1626 348/789 |
| 2008/0218704 A1 | 9/2008 | Yagyu | | |
| 2009/0066916 A1* | 3/2009 | Brown | ................. | H04N 9/3129 353/31 |
| 2009/0128782 A1* | 5/2009 | Miller | ................... | G02B 27/104 353/20 |
| 2009/0147224 A1 | 6/2009 | Kurozuka et al. | | |
| 2010/0007861 A1 | 1/2010 | Takezawa | | |
| 2011/0018986 A1* | 1/2011 | Sprague | ............... | G02B 27/104 348/61 |
| 2014/0293246 A1* | 10/2014 | Takemoto | .............. | G02B 26/10 353/98 |

FOREIGN PATENT DOCUMENTS

| | | |
|---|---|---|
| JP | 2005250088 A | 9/2005 |
| JP | 2006337941 A | 12/2006 |
| JP | 2007206359 A | 8/2007 |

(Continued)

OTHER PUBLICATIONS

Notice of Reasons for Rejection corresponding to Application No. 2013-217041; Mailing date of this notice: Oct. 20, 2015, with English translation.

*Primary Examiner* — Sultan Chowdhury
*Assistant Examiner* — Magda Cruz
(74) *Attorney, Agent, or Firm* — Cantor Colburn LLP

(57) ABSTRACT

A laser beam projection apparatus includes a first light source module including a red color laser light source, a green color laser light source, and a blue color laser light source, and a light source module for combination configured to be capable of emitting a laser beam and be used in combination with the first light source module according to use. The first light source module includes a first casing, and the light source module for combination includes a second casing. The first casing and the second casing have a common casing configuration including at least light source fitting portions.

9 Claims, 6 Drawing Sheets

(56) References Cited

FOREIGN PATENT DOCUMENTS

| JP | 2008003125 A | 1/2008 |
|---|---|---|
| JP | 2008216840 A | 9/2008 |
| JP | 2009-533715 A | 9/2009 |
| JP | 2010019954 A | 1/2010 |
| JP | 2011-91396 A | 5/2011 |
| JP | 2011170097 A | 9/2011 |
| JP | 2013190514 A | 9/2013 |
| WO | 2007034875 A1 | 3/2007 |
| WO | 2007/120831 A2 | 10/2007 |

* cited by examiner

Raster Scanning

Lissajous Scanning

LASER BEAM PROJECTION APPARATUS AND PROJECTOR HAVING LIGHT SOURCE MODULE FOR COMBINATION

CROSS REFERENCE TO RELATED APPLICATION

This application is based upon and claims the benefit of priority from Japanese patent application No. 2013-217041, filed on Oct. 18, 2013, the disclosure of which is incorporated herein in its entirety by reference.

TECHNICAL FIELD

The present invention relates to a laser beam projection apparatus and a projector.

BACKGROUND ART

A method of collecting laser beams of three primary colors of light, i.e., red, green and blue colors to one laser beam, then irradiating a mirror capable of swinging two-dimensionally with the laser beam, irradiating a two-dimensional space with the laser beam from the mirror, and forming a projected image is known. For example, JP 2009-533715 W discloses a method of disposing laser beams of red, blue and green colors to cause the beams to assume predetermined beam axes, combining laser beams of respective colors, and deflecting and scanning a resultant beam obtained by the combining by using a deflecting device. JP 2011-91396 A discloses a method of combining beams as one laser beam by using a mirror capable of selectively transmitting or reflecting a laser light source attached to a CAN package or a frame package and a laser light source in a chip state.

SUMMARY OF INVENTION

Technical Problem

In the methods described in JP 2009-533715 W and JP 2011-91396 A, laser beams of red, green and blue colors are handled as one set and a combination of sets is mounted on a predetermined package. Therefore, there is a problem that only a light quantity that becomes sum total of respective light sources can be obtained and a sufficient projected light quantity cannot be obtained after deflection scanning.

With respect to such methods, it is studied to change light sources to change colors (change a combination of colors) of laser beams included in at least one set included in a plurality of sets, combine them, and emit a resultant beam. In this case, however, there is a problem that it takes time to conduct various adjustments in one package for emitting a laser beam due to a change of light sources in the set. Furthermore, there is a problem that facilities such as a jig for the adjustment cannot be for a package mounting a different combination of colors.

The present invention has been achieved in view of the above-described circumstances. An object of the present invention is to provide a laser beam projection apparatus and a projector capable of reducing time for adjustments in optical arrangement.

Solution to Problem

In order to solve the problem, according to a first aspect of the present invention, there is provided a laser beam projection apparatus including a first light source module configured to include a red color laser light source to emit a laser beam of red color, a green color laser light source to emit a laser beam of green color, and a blue color laser light source to emit a laser beam of blue color and configured to combine the laser beams respectively of the colors and emit a resultant laser beam, and a light source module for combination configured to be capable of emitting a laser beam and be used in combination with the first light source module according to use. The first light source module includes a first casing. The light source module for combination includes a second casing. The first casing and the second casing have a common casing configuration including at least light source fitting portions. The first light source module is formed by attaching the red color laser light source, the green color laser light source and the blue color laser light source respectively to the light source fitting portions in the first casing. And the light source module for combination is formed by attaching light sources that are same as or different from an adjacent one among the red color laser light source, the green color laser light source, the blue color laser light source, and other laser light sources to the light source fitting portions in the second casing.

According to another aspect of the present invention, it is desirable in the above-described invention that the laser beam emitted from the first light source module and the laser beam emitted from the light source module for combination are combined by a beam combining device.

According to another aspect of the present invention, it is desirable in the above-described invention that a laser beam obtained by combining in the beam combining device is incident on a beam scanning means, and the beam scanning means includes a mirror unit configured to reflect the laser beam and a mirror drive device configured to cause the mirror unit to be capable of swinging in different axis directions separately and independently.

According to another aspect of the present invention, it is desirable in the above-described invention that the mirror drive device in the beam scanning means is a capacitance actuator of MEMS type.

According to another aspect of the present invention, it is desirable in the above-described invention that a third casing different from the first casing and the second casing is provided, and the beam combining device and the beam scanning means are attached integrally to the third casing.

According to another aspect of the present invention, it is desirable in the above-described invention that the red color laser light source, the green color laser light source and the blue color laser light source are controlled in output light quantity on the basis of control in the control unit, and the control unit controls outputs respectively of the red color laser light source, the green color laser light source, and the blue color laser light source on the basis of an image signal corresponding to image data which is input from outside.

According to another aspect of the present invention, it is desirable in the above-described invention that the laser beams emitted from the first light source module and the light source for combination are parallel beams, a detection device configured to detect a reflected component of the emitted laser beams is provided, and in a case when the detection device has detected a target moving in a projection area where the laser beams are projected, from a variation of a measured distance based on the reflected component of the laser beams, the control unit exercises control to reduce outputs respectively of the red color laser light source, the green color laser light source and the blue color laser light source.

According to another aspect of the present invention, there is provided a projector including the laser beam projection apparatus according to the above-described invention, wherein the laser beam projection apparatus includes a battery, the laser beam projection apparatus is capable of being engaged with an engagement casing that shields external light, and in a state in which the laser beam projection apparatus is engaged with the engagement casing, power greater than power supplied from the battery is supplied to the laser beam projection apparatus via the engagement casing.

Advantageous Effects of Invention

According to the present invention, it is possible to provide a laser beam projection apparatus and a projector capable of reducing time for adjustments in optical arrangement.

DESCRIPTION OF EMBODIMENTS

Figure 1:
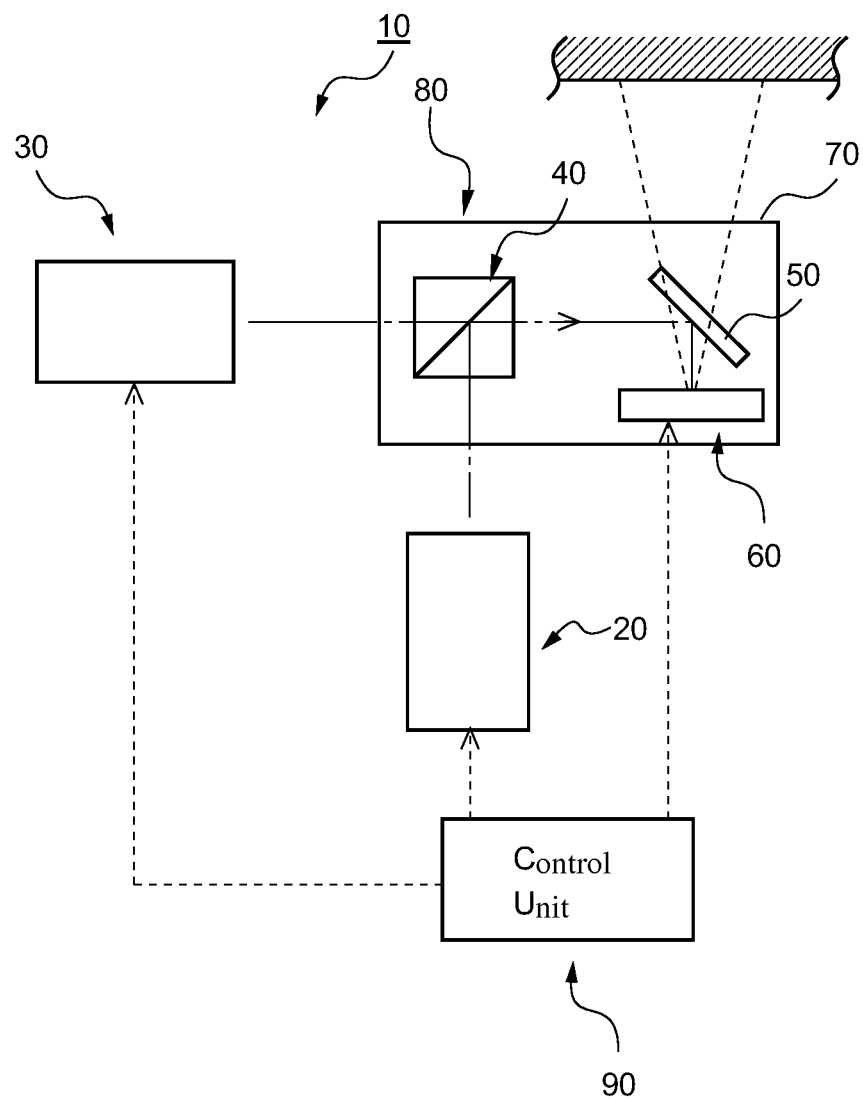
FIG. 1 is a diagram showing a schematic configuration of a laser beam projection apparatus for scanning and projecting a laser beam according to an embodiment of the present invention.

Hereinafter, a laser beam projection apparatus 10 according to an embodiment of the present invention will be described with reference to drawings.
<Outline of Present Invention>
As for the laser beam projection apparatus 10 according to the present invention described hereinafter, it is intended to promote communization in various optical products by forming a portion having versatility that can be communized as a communized common unit, and forming a portion required to have an individual optical function in an individual product by adding a new member concerning the function to the communized unit or conducting replacement to a new member concerning the function. As a result, even if products are various different optical products, facilities for production are communized in production of communized units. Therefore, a merit in cost can be increased. Furthermore, every individual product, it also becomes possible to reduce time for adjustment. Hereinafter, details thereof will be described.
<Schematic Configuration of Laser Beam Projection Apparatus 10>
FIG. 1 is a diagram showing a schematic configuration of the laser beam projection apparatus for scanning and projecting a laser beam according to an embodiment of the present invention. The laser beam projection apparatus 10 includes a first light source module 20, a second light source module 30, a beam combining device 40, and a beam scanning device 60 as principal components.

Figure 2:
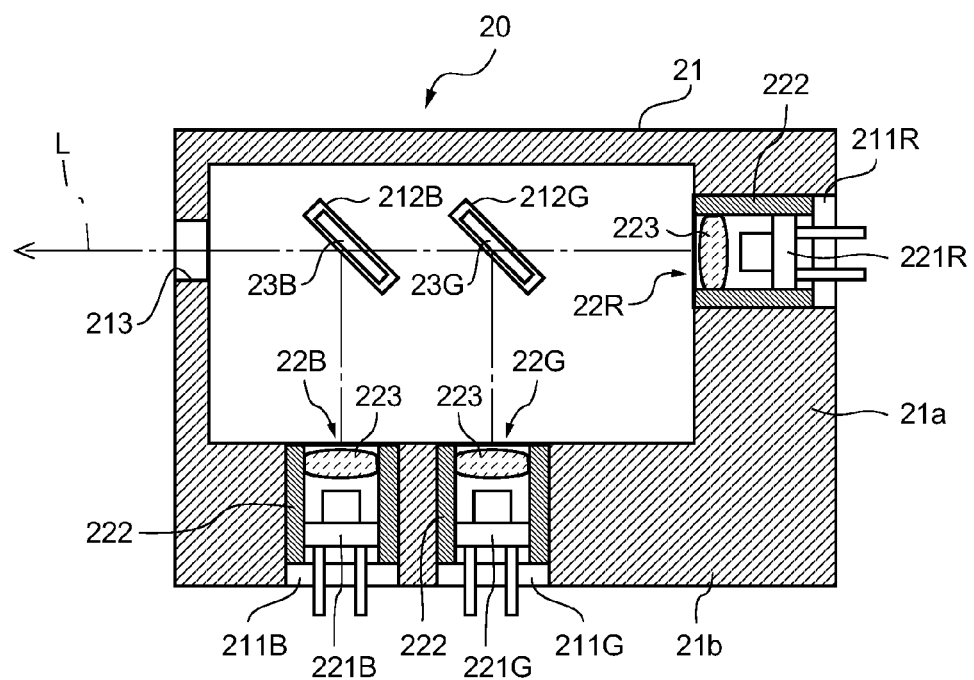
FIG. 2 is a diagram showing a schematic configuration of a first light source module and corresponding to a plane sectional view.

First, the first light source module 20 will now be described. FIG. 2 is a diagram showing a schematic configuration of the first light source module 20. FIG. 2 corresponds to a plane sectional view. As shown in FIG. 2, the first light source module 20 includes a casing 21 (corresponding to a first casing), light source units 22 (22R, 22G and 22B) and a dichroic mirror 23. Among them, the casing 21 includes light source fitting portions 211 (211R, 211G and 211B). A light source unit 22 is attached to the light source fitting portion 211. Three light source fitting portions 211 are provided in the casing 21. The light source units 22 capable of projecting laser beams having wavelengths of red, green and blue colors are attached to those three light source fitting portions 211, respectively.

By the way, the casing 21 is formed by, for example, aluminum die casting in view of thermal conductivity and the like. In a case where thermal conductivity can be secured, however, the casing 21 may be formed by, for example, injection molding of resin. The casing 21 may be formed by using other materials and techniques.

In the configuration shown in FIG. 2, the light source fitting portion 211R is provided on a wall face 21a of the casing 21 which collides with an optical axis L heading toward an exit aperture 213. The light source unit 22R (corresponding to the red color laser light source) including a laser diode 221R capable of emitting a laser beam of red color is attached to the light source fitting portion 211R.

Furthermore, the light source fitting portions 211G and 211B are provided on a wall face 21b crossing the wall face 21a on which the light source fitting portion 211R is provided. Among them, the light source fitting portion 211G is provided in a region located nearer to the light source fitting portion 211R. The light source unit 22G (corresponding to the laser light source of green color) including a laser diode 221G capable of emitting a laser beam of green color is attached to the light source fitting portion 211G. The light source fitting portion 211B is provided on a side located apart from the light source fitting portion 211R. The light source unit 22B (corresponding to the laser light source of blue color) including a laser diode 221B capable of emitting a laser beam of blue color is attached to the light source fitting portion 211B.

By the way, the laser beam of red color is a laser beam having a single wavelength in the range of 635 to 690 nm. For example, there is a laser beam of red color having a wavelength of 640 nm. The laser beam of green color is a laser beam having a single wavelength in the range of 500 to 560 nm. For example, there is a laser beam of green color having a wavelength of 515 or 532 nm. The laser beam of blue color is a laser beam having a single wavelength in the range of 435 to 480 nm. For example, there is a laser beam of blue color having a wavelength of 450 nm.

In the ensuing description, the light source units 22R, 22G and 22B are generically referred to simply as light source units 22 in a case where distinction depending upon color or the like is unnecessary. In the same way, the light source fitting portions 211R, 211G and 211B are generically referred to simply as light source fitting portions 211 in a case where distinction among them is unnecessary. The laser diodes 221R, 221G and 221B are also generically referred to simply as laser diodes 221 in a case where distinction among them is unnecessary.

In the present embodiment, the light source fitting portion 211 is a hole portion. The light source unit 22 is attached to the casing 21 by a technique such as pushing the light source unit 22 into the light source fitting portion 211 which is the hole portion. By the way, in order to position the light source unit 22, it is desirable to adopt a configuration that regulates the pushing the light source 22 by providing a region narrowed in diameter or a flange portion in the hole portion which is the light source fitting portion 211.

Furthermore, in the present embodiment, the light source unit 22 includes the laser diode 221, an engagement member 222, and a collimator lens 223. The laser diode 221 is a light source which emits a laser beam. As shown in FIG. 2, the laser diode 221 is attached within the cylindrical (ring shaped) engagement member 222. Furthermore, the collimator lens 223 is also attached within the engagement member 222 in the same way. The laser beam emitted from the laser diode 221 is incident on the collimator lens 223. A laser beam emitted from the collimator lens 223 is thus regulated to be a parallel beam.

By the way, the form of the engagement member 222 and the way of attachment of the laser diode 221 to the engagement member 222 are not restricted to those shown in FIG. 2. For example, the length of the engagement member 222 in the axis line direction may be made shorter.

Laser beams emitted from the laser diodes 221 of respective colors differ in divergence angle. In the engagement member 222, therefore, the attachment position of the collimator lens 223 to the engagement member 222 is made adjustable by movement in the light axis direction to cause the laser beam after passage of the collimator lens 223 to become parallel beam. By the way, when attaching either the laser diode 221 or the collimator lens 223 to the engagement member 222, an attaching technique of screw type may be adopted in order to facilitate an optical adjustment between the laser diode 221 and the collimator lens 223.

Furthermore, as for the engagement member 222, a configuration using a different engagement member every kind of the laser diode 221 may be adopted. In this case, the position relation between the attachment position of the laser diode 221 and the attachment position of the collimator lens 223 may be made constant every kind of the laser diode 221 by, for example, providing a locking unit in the engagement member 222 to conduct positioning in the axis line direction.

Furthermore, mirror fitting portions 212 (212G and 212B) are provided in the casing 21. Dichroic mirrors 23 (23G and 23B) are attached to the mirror fitting portions 212. In the present embodiment, a dichroic mirror 23G which reflects a laser beam of green color, but transmits a laser beam of red color is attached to the mirror fitting portion 212G located nearer the light source fitting portion 211R. By the way, the dichroic mirror 23G may be one that transmits only a laser beam of red color. Furthermore, the dichroic mirror 23B which transmits a laser beam of green color and a laser beam that is longer in wavelength than the green color, but reflects a laser beam of blue color which is shorter in wavelength than the green color is attached to the mirror fitting portion 212B located on a side apart from the light source fitting portion 211R.

Figure 3:
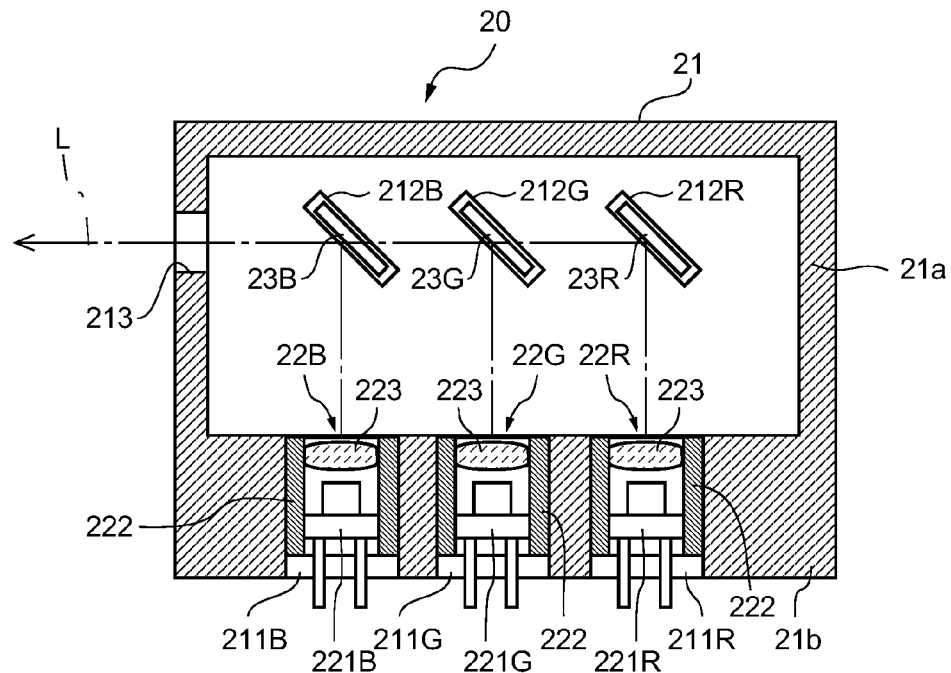
FIG. 3 is a diagram showing a schematic configuration of a first light source module according to a modification of FIG. 2 and corresponding to a plane sectional view.

By the way, a configuration as shown in FIG. 3 may be adopted instead of adopting the configuration as shown in FIG. 2. FIG. 3 is a diagram showing a schematic configuration of the first light source module 20 according to a modification of FIG. 2. FIG. 3 corresponds to a plane sectional view.

For example, in a case where a region for providing an electric connection region of the first light source module 20 is restricted because of a space constraint or the like of the laser beam projection apparatus 10, the configuration shown in FIG. 3 can be used. In the configuration shown in FIG. 3, the light source fitting portions 211R, 211G and 211R are provided on the same wall face 21b. Furthermore, a mirror fitting portion 212R is newly provided to reflect a laser beam of red color from the light source unit 22R attached to the light source fitting portion 211R. A mirror 23R or a dichroic mirror 23R which reflects a laser beam of red color is attached to the mirror fitting portion 212R.

The first light source module 20 has the configuration described heretofore.

The second light source module 30 corresponding to a light source module for combination will now be described. By the way, many portions of the second light source module 30 basically has a configuration common to that of the first light source module 20. In other words, a casing 31 (corresponding to a second casing) in the second light source module 30 has a configuration common to the above-described casing 21. Furthermore, the casing 31 includes light source fitting portions 311 similar to the light source fitting portions 211, includes mirror fitting portions 312 similar to the mirror fitting portions 212, and includes an exit aperture 313 similar to the exit aperture 213.

As for light source units 32 attached to the light source fitting portions 311 in the casing 31, however, suitable light source units are used according to use of the laser beam projection apparatus 10. In other words, light source units 32 capable of emitting suitable laser beams can be attached to the light source fitting portions 311 according to required chromaticity, illuminance and the like.

By the way, as for laser diodes 321, engagement members 322 and collimator lenses 323 in the light source units 32, ones similar to the laser diodes 221, the engagement members 222 and the collimator lenses 223 in the above-described light source unit 22 may be used, or different ones may be used according to needs. Furthermore, as for dichroic mirrors 33 attached to the mirror fitting portions 312 as well, ones similar to the above-described dichroic mirrors 23 may be used or different ones may be used according to needs.

As for attachment of the light source units 32 to the light source fitting portions 311, there are the following examples. In a case where an image is formed by combining laser beams, it is necessary that a beam of white color can be formed. Such a beam of white color is formed by combining laser beams of red color, green color and blue color with a predetermined ratio. However, increasing the quantity of light of the laser beam of blue color does not contribute to improvement of brightness (illuminance) remarkably.

In the second light source module 30, therefore, a light source unit 32R which emits a laser beam of red color and a light source unit 32G which emits a laser beam of green color may be provided without providing a light source unit 32B which emits a laser beam of blue color. For example, in a case where three light source units 32 are disposed, all light source units 32 may be the light source units 32R each of which emits a laser beam of red color, all light source units 32 may be the light source units 32G each of which emits a laser beam of green color, or one or two light source units 32R emitting a laser beam of red color may be provided together with two or one light source unit 32G emitting a laser beam of green color.

In particular, the light source unit 32G which emits a laser beam of green color contributes to improvement of luminance remarkably. In a case where the efficiency of the light source unit 22R which emits a laser beam of red color is high in the first light source module 20, therefore, a beam of white color can be formed in the second light source module 30 even if a configuration in which only light source units 32G each emitting a laser beam of green color are provided or a configuration in which the number of the light source units 32G each emitting a laser beam of green color is made larger than the number of the light source units 32R each emitting a laser beam of red color is adopted.

Figure 4:
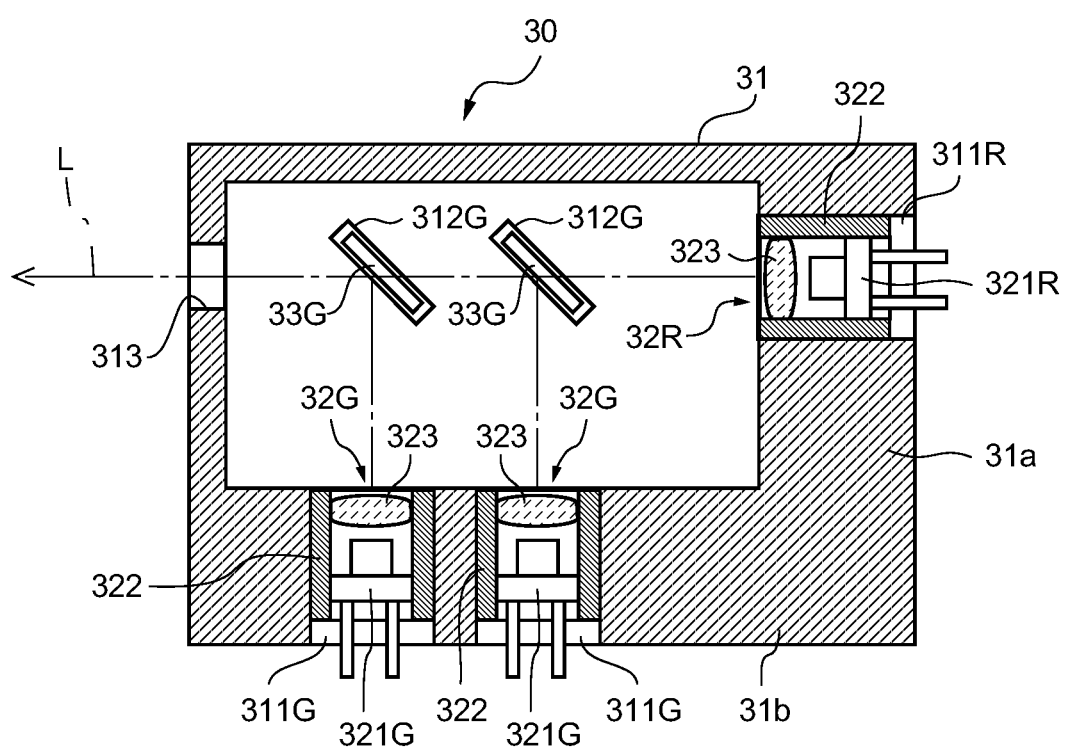
FIG. 4 is a diagram showing an example of a schematic configuration of a second light source and corresponding to a plane sectional view.

An example of the second light source module 30 as described above is shown in FIG. 4. FIG. 4 is a diagram showing an example of a schematic configuration of the second light source module 30. FIG. 4 corresponds to a plane sectional view. In FIG. 4, a configuration in which two light source units of green color 32G and one light source unit of red color 32R are provided without providing a light source unit of blue color instead of the light source unit 22B of blue color in FIG. 2 is adopted to improve luminance.

Furthermore, in the second light source module 30, an infrared sensor including a light source unit 32 capable of emitting an infrared laser beam may be attached instead of the light source units 32 of red color, green color and blue color. By the way, the infrared sensor includes a light sensing unit which receives a reflected beam (specular reflected beam) of an emitted beam. The infrared sensor is used to measure a distance to a target region (for example, a projection plane) by light sensing on the light sensing unit. Furthermore, the infrared sensor corresponds to a detection device. However, a sensor other than the infrared sensor may be used as the detection device. As for such sensors, there are various sensors such as, for example, a sensor using a photodiode of light emitter/receiver type, a sensor that recognizes a moving substance by image processing.

Besides, as the light source units 32, various laser beams, such as a yellow laser beam, a bluish purple laser beam, a purple laser beam, an orange-colored laser beam, and a laser beam in the ultraviolet area, can be used as occasion demands.

As for the light source units 32 in the second light source module 30, it is possible to combine and attach various light source units 32 according to, for example, a product request such as demanded (desired) illuminance. In other words, whereas the first light source module becomes a base, the second light source module 30 becomes a light source module 20 for combination.

Laser beams respectively emitted from the first light source module 20 and the second light source module 30 having the configurations described above are combined (multiplexed) to become one beam by the beam combining device 40 in FIG. 1. As a result, the laser beam after emitted from the beam combining device 40 has illuminance (energy) improved as compared with the case of being emitted only from the single first light source module 20. In a case where the second light source module 30 includes, for example, the light source unit 32G of green color, therefore, it becomes possible to improve the brightness as compared with the case where only the first light source module 20 is used singly.

It is possible to use a prism as the beam combining device 40. By the way, it is possible to dispose an optical element 50, such as a condenser lens, a collimator lens, and a mirror, as occasion demands besides the prism used as the beam combining device 40. Furthermore, it is also possible to adopt a configuration in which a mirror is used instead of the prism and the optical element 50, such as a condenser lens, a collimator lens, and a mirror, is disposed as occasion demands besides the mirror (In FIG. 1, only a mirror is illustrated as the representative optical element 50.)

After being passed through the beam combining device 40 and the optical element 50 as occasion demands, the laser beam is incident on the beam scanning device 60. By the way, in the configuration shown in FIG. 1, the beam combining device 40 and the beam scanning device 60 are attached to a casing 70 (corresponding to a third casing) integrally and they form one optical unit 80. However, the beam combining device 40 and the beam scanning device 60 may be adjusted in position individually without being attached to the casing 70.

Figure 5:
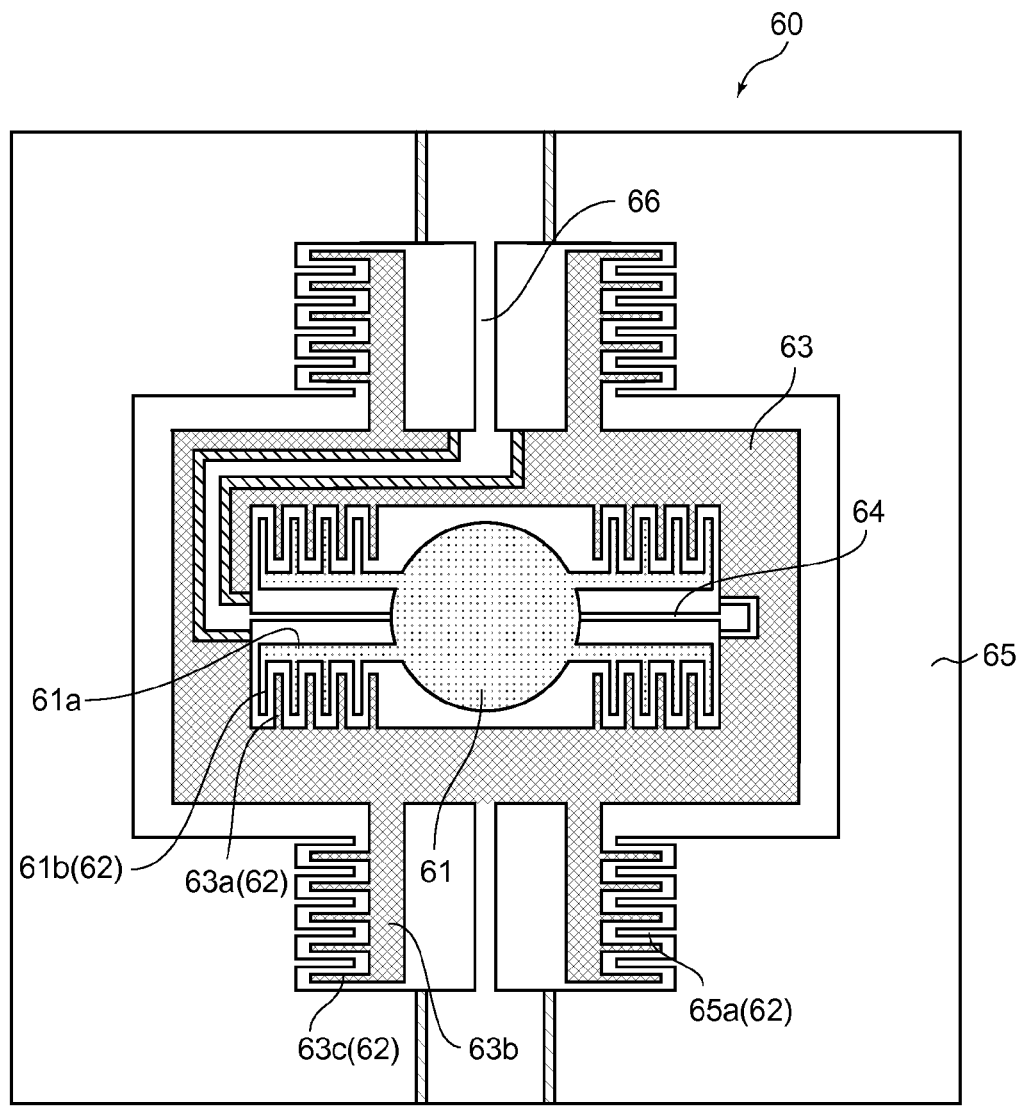
FIG. 5 is a plane view showing a configuration of a beam scanning device of MEMS type.

The beam scanning device 60 includes a mirror unit 61 (see FIG. 5). The beam scanning device 60 drives the mirror unit 61 by using a mirror drive device 62, which will be described later, and thereby operates the laser beam in a projection region to form a projection image.

As the beam scanning device 60, there is one that drives the mirror unit 61 by utilizing a capacitance actuator of MEMS type. Its configuration is shown in FIG. 5. FIG. 5 is a plane view showing a configuration of the beam scanning device 60 of MEMS type. The beam scanning device 60 shown in FIG. 5 includes an inner frame unit 63. The mirror unit 61 is supported on an inner frame side of the inner frame unit 63 via a torsion axis 64. The mirror unit 61 is formed by evaporating a reflection material such as silver on a wafer. When forming the mirror unit 61, the material, thickness of evaporation, and a layer configuration of evaporation are determined suitably according to the wavelength, intensity and reflection efficiency of the laser beam.

The torsion axis 64 is a shaft portion that allows swinging the mirror unit 61 with respect to the inner frame unit 63 and is a portion that makes it possible to give torsion. Furthermore, an extension unit 61a extends from the mirror unit 61. A plurality of mirror side comb-tooth electrodes 61b are provided to project from the extension unit 61a. The mirror side comb-tooth electrodes 61b are provided to be opposed to and alternately with first comb-tooth electrodes 63a of the inner frame unit 63. The mirror drive device 62 is formed by such a configuration. One of the mirror side comb-tooth electrodes 61b and the first comb-tooth electrodes 63a is projected to a top face or a bottom face of the beam scanning device 60 as compared to the other. When a voltage is applied to the mirror side comb-tooth electrodes 61b and the first comb-tooth electrodes 63a, therefore, torsion force is applied to the torsion axis 64 by attraction and repulsion acting between them. As a result, it is made possible to drive (swing) the mirror unit 61.

Furthermore, the inner frame unit 63 is supported to an outer frame unit 65 via a torsion axis 66 which makes it possible to give torsion. A configuration similar to the configuration between the mirror unit 61 and the inner frame unit 63 is provided between the inner frame unit 63 and the outer frame unit 65 as well. In other words, an extension unit 63b extends from the inner frame unit 63. Second comb-tooth electrodes 63c are provided to be projected from the extension unit 63b. The second comb-tooth electrodes 63c are provided to be opposed to and alternately with outer frame side comb-tooth electrodes 65a of the outer frame unit 65. The mirror drive device 62 is formed by such a configuration. One of the second comb-tooth electrodes 63c and the outer frame side comb-tooth electrodes 65a is projected to the top face or the bottom face of the beam scanning device 60 as compared to the other. When a voltage is applied to the second comb-tooth electrodes 63c and the outer frame side comb-tooth electrodes 65a, therefore, torsion force is applied to the torsion axis 66 by attraction and repulsion acting between them. As a result, it is made possible to drive (swing) the mirror unit 61.

Between the mirror side comb-tooth electrodes 61b and the first comb-tooth electrodes 63a and between the second comb-tooth electrodes 63c and the outer frame side comb-tooth electrodes 65a described above, the vibration period of the mirror unit 61 and a swing width in the vibration can be set according to the applied voltage. If in this case the drive period of the mirror unit 61 is short, it is desirable that the drive frequency is close to the resonance frequency of the mirror unit 61. In the present embodiment, a voltage of 120 V with 20 kHz is applied to the torsion axis 64 concerning main scanning, and a voltage of 50 V with 60 Hz is applied to the torsion axis 66 concerning sub scanning. The swing angle is set to be 40 degrees in the main scanning direction and set to be 20 degrees in the sub scanning direction. However, the frequency, voltage and swing angle are not restricted to these values, but they can be set to various values.

Figure 6:
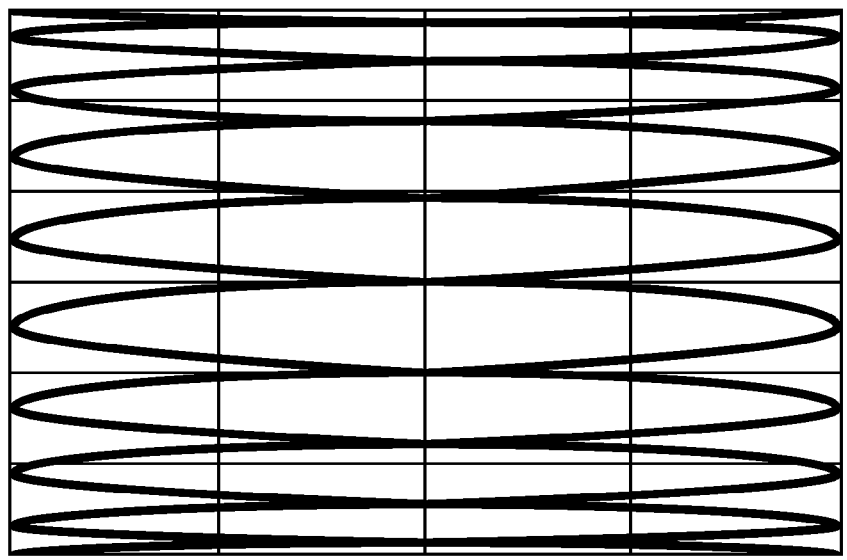
FIG. 6 is a diagram showing a scanning image in case of raster scanning.
Figure 7:
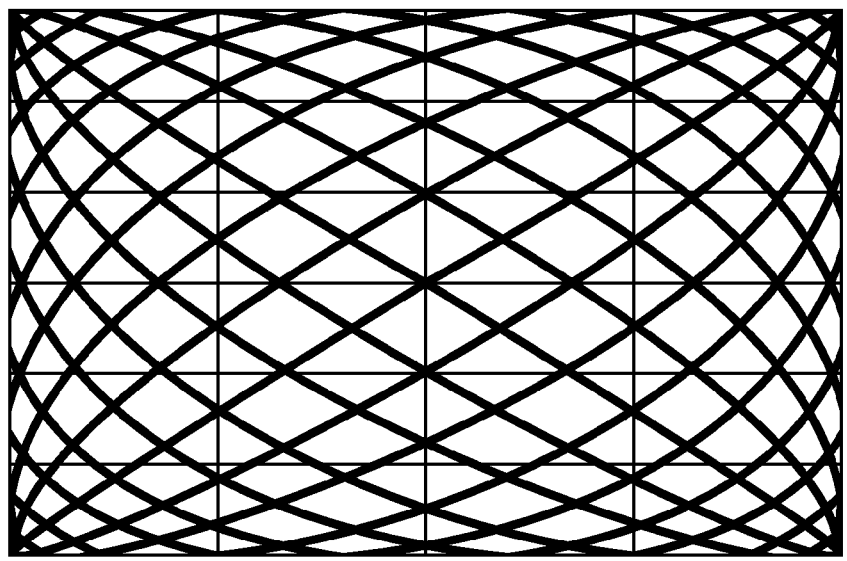
FIG. 7 is a diagram showing an image in case of Lissajous scanning.

Furthermore, as for voltages applied to the electrodes 61b, 63a, 63c and 65a, a trapezoidal wave, a sawtooth wave or the like can be set suitably besides a sine wave according to the follow-up property of the mirror unit 61. FIG. 6 is a diagram showing a scanning image in case of raster scanning. FIG. 7 is a diagram showing an image in case of Lissajous scanning. By the way, in the raster scanning, a sawtooth wave may be applied in the sub scanning direction instead of the sine wave. In the Lissajous scanning, a sine wave may be applied in the sub scanning direction.

Furthermore, the laser beam projection apparatus 10 shown in FIG. 1 includes a control unit 90 besides the above-described components. The control unit 90 takes charge of working of the laser diodes 221, the laser diodes 321, and the mirror drive device 62. Furthermore, in a case where the laser beam projection apparatus 10 includes an infrared sensor, it is also possible for the control unit 90 to control working of the laser diodes 221, the laser diodes 321, and the mirror drive device 62 on the basis of input of a detection signal from the infrared sensor. As for the control unit 90, a control program for implementing a predetermined function is stored in a memory and a central processing unit in the control unit 90 executes the control program. As a result, the control unit 90 can implement various controls. Among the controls, there is individual control of outputs of the laser diodes 221 and 321 based on an image signal corresponding to image data which is input from outside to the control unit 90.

By the way, it is desirable to adopt a configuration in which the control unit 90 exercises control on the upstream side and an ASIC (Application Specific Integrated Circuit) is provided to control outputs of the laser diodes 221 and 321 and drive of the mirror drive device 62 on the basis of a command from the control unit 90.

Figure 8:
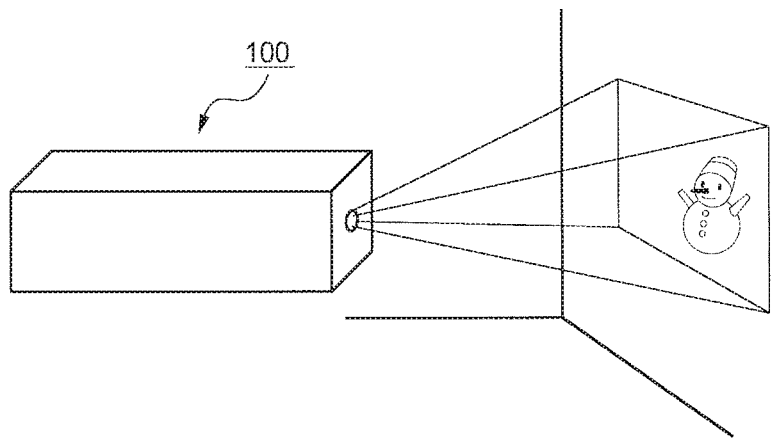
FIG. 8 is a diagram showing an example of a configuration of a projector using the laser beam projection apparatus.

FIG. 8 is a diagram showing an example of a configuration of a projector 100 using the above-described laser beam projection apparatus 10. The projector 100 shown in FIG. 8 includes the above-described laser beam projection apparatus 10 shown in FIG. 1 and the control unit 90 taking charge of working of respective regions of the laser beam projection apparatus 10. The projector 100 projects a projection image based on image data, which is input to the control unit 90, onto a plane. For example, in the projector 100 shown in FIG. 8, the laser beam of the first light source module 20 and the laser beam of the second light source module 30 are combined and consequently the illuminance is increased. For example, 100 lumen is obtained. The emitted light quantity is increased remarkably as compared with the conventional projector.

In this way, the illuminance is increased in the projector 100.

However, it is not desirable to look straight at such a laser beam increased in illuminance. In a case where a person enters a projection area shown in FIG. 8, a specular reflection component in the reflected beam is returned to the light source side by the beam scanning device 60. If in that case the control unit 90 judges that a person has entered by light sensing in the above-described light sensing unit in the infrared sensor, the control unit 90 exercises control to decrease the outputs of the respective light source units 22 and 32, and decreases the emitted light quantity to, for example, 20 lumen. As a result, the safety is secured.

In addition, in the present embodiment, the laser beam projection apparatus 10 can implement high luminance in spite of its small size. For example, therefore, it is also possible to implement the projector 100 of rear projection system using a screen.

Figure 9:
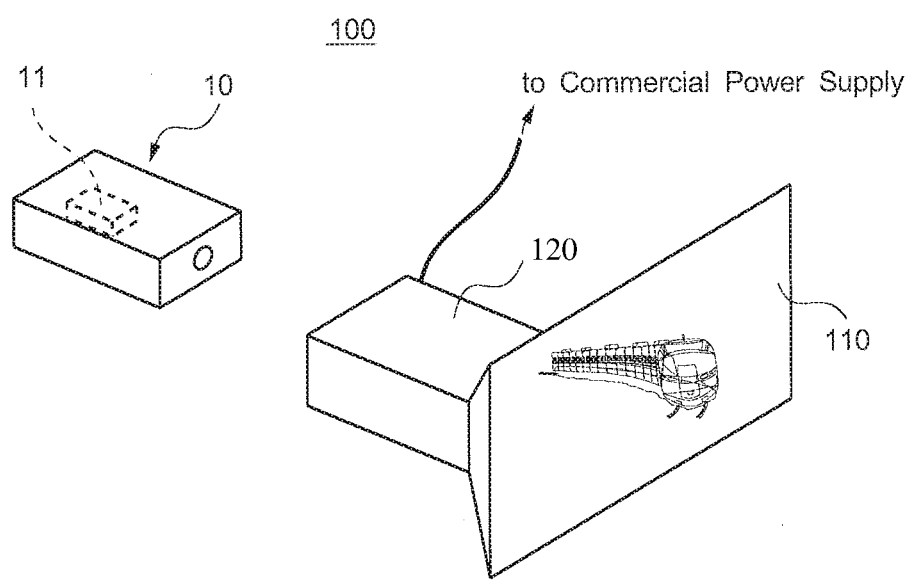
FIG. 9 is an oblique view showing an example of a projector of rear projection system using the laser beam projection apparatus.

By the way, in case of application to the rear projection system, a configuration as shown in FIG. 9 may be used. FIG. 9 is an oblique view showing an example of the projector 100 of the rear projection system. In a case where the laser beam projection apparatus 10 is configured to house a battery 11 functioning as a power supply and used as the laser beam projection apparatus 10 singly, as shown in FIG. 9, the laser beam projection apparatus 10 is used in a state in which the light quantity is kept down (for example, to 20 lumen). On the other hand, in a case where the laser beam projection apparatus 10 is used in the projector 100 of rear production system including a screen 110 as shown in FIG. 9, the laser beam projection apparatus 10 is engaged with an engagement casing 120 included in the projector 100. And the engagement casing 120 is configured to include a power supply device capable of supplying external commercial power supply. On the other hand, the laser beam projection apparatus 10 is configured to have an engaged unit to be electrically connected to the power supply device.

In a state in which the laser beam projection apparatus 10 is engaged with the engagement casing 120, therefore, the external commercial power supply is supplied to the laser beam projection apparatus 10 and the laser beam projection apparatus 10 can be used in a state in which the light quantity is increased (for example, to 100 lumen). As a result, the laser beam projection apparatus 10 is suitable to use as a projection portion of TV or an image player.

<Effects>

In the laser beam projection apparatus 10 having the configuration described heretofore, the casing 21 in the first light source module 20 and the casing 31 in the second light source module 30 have a common casing configuration. As for position adjustment of the collimator lenses 223 and 323 and output adjustment of the laser beams emitted from respective laser diodes 221 and 321, therefore, it becomes possible to use common jigs for the casing 21 and the casing 31.

In the conventional laser beam projection apparatus, required laser diodes 321 are assembled into one casing according to certain specific needs. In addition, the position adjustment of the collimator lenses 323 is conducted according to the laser diodes 321. In one casing, such adjustments require time. Furthermore, even a package produced in that way cannot cope with other needs, and complicated adjustments are needed in one casing again.

On the other hand, in the laser beam projection apparatus 10 in the present embodiment, communization is conducted for portions that have versatility and that can be made common, such as the casing 21 and the casing 31, and one unit is formed for each of the casing 21 and the casing 31. In other words, units are distinguished like the casing 21 and the casing 31, and in one unit among them, the light source units 32 to be incorporated are also conformed to required functions and characteristics. As a result, it is possible to cope with needs flexibly. In other words, it becomes possible to produce the laser beam projection apparatus 10 conformed to various needs flexibly and easily by using a combination of the first light source module 20 including the casing 21 which is a communized region and the second light source module 30 in which the light source units 32 incorporated to exhibit desired functions can be made suitable in combination with the first light source module 20.

Furthermore, it is only necessary to conduct optical adjustments every distinguished unit. As a result, the work of the adjustments can be made constant every unit and it becomes possible to reduce time for adjustments remarkably. Furthermore, owing to the communization described above, it becomes possible to reduce the production cost of the laser beam projection apparatus 10.

Furthermore, in the present embodiment, it becomes possible to incorporate suitable light source units 32 conformed to needs into the second light source module 30. As a result, it becomes possible to sufficiently exhibit desired characteristics and functions according to needs. For example, in a case where brightness is needed, it is possible to adopt a configuration in which two light source units 32G of green color are provided in the second light source module 30 as shown in FIG. 4. Furthermore, it also becomes possible to select and incorporate laser diodes 321 emitting laser beams of suitable outputs and colors according to outputs and luminous efficiencies of respective laser diodes 321.

Furthermore, in the present embodiment, the laser beam emitted from the first light source module 20 and the laser beam emitted from the second light source module 30 are combined by the beam combining device 40. By using the beam combining device 40, it becomes possible to collect the laser beams respectively emitted from the casings 21 and 31 into one beam and it becomes possible to improve the illuminance.

In addition, in the present embodiment, the laser beam advancing through the beam combining device 40 is incident on the beam scanning device 60. The beam scanning device 60 includes the mirror unit 61 which reflects a laser beam and the mirror drive device 62 which can swing the mirror unit 61 in different axis directions independently. If the mirror drive device 62 is made to operate in a state in which the laser beam obtained by collection in the beam combining device 40 is reflected by the mirror unit 61, therefore, it is possible to conduct scanning with the laser beam two-dimensionally. It becomes possible to form a desired image by control of working of the laser diodes 221 and 321 in the control unit 90 together with the two-dimensional scanning of the laser beam.

Furthermore, in the present embodiment, the mirror drive device 62 in the beam scanning device 60 is the capacitance actuator of MEMS type. Therefore, it is possible to implement drive according to voltages applied to the mirror drive device 62 (between the mirror side comb-tooth electrodes 61b and the first comb-tooth electrodes 63a and between the second comb-tooth electrodes 63c and the outer frame side comb-tooth electrodes 65a). Furthermore, the voltage between the mirror side comb-tooth electrodes 61b and the first comb-tooth electrodes 63a and the voltage between the second comb-tooth electrodes 63c and the outer frame side comb-tooth electrodes 65a vary according to a variation of the capacitance. Therefore, it becomes possible to detect a drive quantity between the electrodes 61b and 63a and a drive quantity between the electrodes 63c and 65a by detecting the voltages. Therefore, it is possible to implement high-precision drive control owing to control of the voltages applied to the mirror drive device 62 exercised by the control unit 90 on the basis of the detected drive quantities.

In addition, in the present embodiment, the casing 70 different from the casing 21 and the casing 31 is provided. The beam combining device 40 and the beam scanning device 60 are integrally attached to the casing 70, and an optical unit 80 is formed. Therefore, the optical unit 80 can be adjusted separately and independently from the first light source module 20 and the second light source module 30. As a result, it becomes possible to improve the work efficiency when assembling the optical unit 80.

Furthermore, in the present embodiment, the light quantities output from the laser diodes 221 and 321 capable of emitting laser beams of respective colors are controlled on the basis of control in the control unit 90. In this case, the configuration in which the control unit 90 exercises control on the upstream side and an ASIC is provided to control outputs of the laser diodes 221 and 321 and drive of the mirror drive device 62 on the basis of a command from the control unit 90 is adopted. As a result, a control portion of the upstream side of the laser diodes 221 and 321 and the mirror drive device 62 can be communized.

In addition, in the present embodiment, the laser beams emitted from the first light source module 20 and the second light source module 30 are parallel beams. In addition, it is possible to adopt a configuration in which an infrared sensor is provided to detect a reflected component of the emitted laser beam. If in that case the control unit 90 has detected a moving target from a variation of a measured distance based on a reflected component of a laser beam in the infrared sensor, it is possible for the control unit 90 to exercise control to reduce outputs respectively of the laser diodes 221 and 321. Even if in the case of such a configuration, for example, a person enters a projection area where the laser beam is projected as shown in FIG. 8, it becomes possible to secure safety owing to control of reducing the output of the laser beam.

Furthermore, in the present embodiment, it is also possible to adopt a configuration in which the laser beam projection apparatus 10 can be docked with the projector 100. In other words, the laser beam projection apparatus 10 has a battery. On the other hand, the projector 100 is configured to include the engagement casing 120 which shields external light and the laser beam projection apparatus 10 is configured to be capable of being engaged with the engagement casing 120. And in a state in which the laser beam projection apparatus is engaged with the engagement casing 120, power greater than power supplied from the battery is supplied to the laser beam projection apparatus 10 via the engagement casing 120. Owing to such a configuration, it becomes possible in bright environment to increase the illuminance of the laser beam by docking the laser beam projection apparatus 10 with the projector 100. It is possible to project a high quality image even in bright environment.

<Modification>

Heretofore, an embodiment of the present invention has been described. Various modifications of the present invention are possible besides the embodiment. Hereinafter, the modifications will be described.

In the above-described embodiment, the projector 100 of rear projection system using the screen 110 is described as an example using the laser beam projection apparatus 10. As a matter of course, however, the laser beam projection apparatus 10 can be applied to various other optical devices (projectors). As such optical devices (projectors), there are, for example, a portion of projecting a laser beam in a duplicating machine, a projector, a display device such as a TV device or a monitor device, a display portion of a game machine having a projection plane, a display portion of a computer device, and a display portion of a mobile terminal. Furthermore, an input device such as a virtual keyboard using the laser beam projection apparatus 10 may be implemented. Furthermore, in a case where there are no specific projection planes, but there is a medium to be irradiated with the laser beam, a stereoscopic optical image may be implemented by irradiating the medium with the laser beam.

Furthermore, in the above-described embodiment, the beam scanning device 60 utilizes the capacitance actuator of MEMS type. However, the beam scanning device 60 is not restricted to ones utilizing a capacitance actuator of MEMS type. As other beam scanning device, there is a metal base beam scanning element using a metal base structure of piezoelectric drive type. A piezoelectric system utilizing distortion of a piezoelectric element may be used. A magnetic system in which the mirror unit is driven by magnetic force may be adopted. By the way, in the case adopting the metal base beam scanning element, the piezoelectric system utilizing or the magnetic system, each drive device of them corresponds to the mirror drive device 62.

Furthermore, in the above-described embodiment, the light source units 22 and 32 are provided and the light source units 22 and 32 are configured to attach the collimator lenses 223 and 323 to the engagement members 222 and 322 as shown in FIGS. 2 to 4. However, the collimator lenses 223 and 323 may be configured to be attached directly to the casings 21 and 31.

Furthermore, in the above-described embodiment, optical components included in the first light source module 20, the second light source module 30 and the optical unit 80 are not restricted to those described above, but various components may be used additionally or selectively as occasion demands. As such optical components, for example, mirrors such as a half mirror or a dichroic mirror, various lenses, various prisms, and optical filters can be mentioned.

Furthermore, in the above-described embodiment, the second light source module 30 corresponds to the module for combination. However, the module for combination is not restricted to one in number, but a configuration using a plurality of modules for combination may be adopted. In the plurality of modules for combination in this case, disposition of the light source units may be the same, or may be different. Furthermore, a configuration using a plurality of first light source modules 20 as well may be adopted.

The invention claimed is:

1. A laser beam projection apparatus comprising:
   a first light source module comprising
      a red color laser light source to emit a laser beam of red color,
      a green color laser light source to emit a laser beam of green color, and
      a blue color laser light source to emit a laser beam of blue color; and
      wherein the first light source module is configured to combine the laser beams respectively of the colors and emit a resultant laser beam; and
   a light source module for combination configured to emit a laser beam and be used in combination with the first light source module according to use; and
   the first light source module comprises a first casing, and the light source module for combination comprises a second casing, the first casing and the second casing have a common casing configuration including at least light source fitting portions,
   the red color laser light source, the green color laser light source and the blue color laser light source are respectively attached to the light source fitting portions in the first casing, and
   the light source module for combination comprises light sources that are same as or different from an adjacent one among the red color laser light source, the green color laser light source, the blue color laser light source, and other laser light sources; the light sources being attached to the light source fitting portions in the second casing.

2. The laser beam projection apparatus according to claim 1, wherein the laser beam emitted from the first light source module and the laser beam emitted from the light source module for combination are combined by a beam combining device.

3. The laser beam projection apparatus according to claim 2, wherein
   a laser beam obtained by combining in the beam combining device is incident on a beam scanning device, and
   the beam scanning device comprises a mirror unit configured to reflect the laser beam and a mirror drive device configured to cause the mirror unit to be capable of swinging in different axis directions separately and independently.

4. The laser beam projection apparatus according to claim 3, wherein the mirror drive device in the beam scanning device is a capacitance actuator of MEMS type.

5. laser beam projection apparatus according to claim 4, further comprising a third casing different from the first casing and the second casing,
   wherein the beam combining device and the beam scanning device are attached integrally to the third casing.

6. The laser beam projection apparatus according to claim 3, further comprising a third casing different from the first casing and the second casing,
   wherein the beam combining device and the beam scanning device are integrally attached to the third casing.

7. The laser beam projection apparatus according to claim 1, wherein
   the red color laser light source, the green color laser light source and the blue color laser light source are controlled in output light quantity on the basis of control in a control unit, and
   the control unit controls outputs respectively of the red color laser light source, the green color laser light source, and the blue color laser light source on the basis of an image signal corresponding to image data which is input from outside.

8. The laser beam projection apparatus according to claim 7, wherein
   one of the light sources attached to the light source fitting portion in the second casing is a light source unit which emits an infrared laser beam and includes an infrared sensor for detecting a reflected component of the infrared laser beam, and in a case when the infrared sensor has detected a target moving in a projection area where the infrared laser beam is projected, from a variation of a measured distance based on the reflected component of the infrared laser beams, the control unit exercises control to reduce outputs respectively of the red color laser light source, the green color laser light source and the blue color laser light source.

9. A projector comprising the laser beam projection apparatus according to claim 1, wherein the laser beam projection apparatus comprises a battery, the laser beam projection apparatus is capable of being engaged with an engagement casing that shields external light, and in a state in which the laser beam projection apparatus is engaged with the engagement casing, power greater than power supplied from the battery is supplied to the laser beam projection apparatus via the engagement casing.

* * * * *